UNITED STATES PATENT OFFICE 2,588,885

PREPARATION OF GAS EXPANDED PLASTIC MATERIALS

Ruth L. Schlessinger, Waterbury, Conn., assignor to United States Rubber Company, New York, N. Y., a corporation of New Jersey No Drawing. Application April 22, 1949, Serial No. 89,157

9 Claims. (Cl. 260—724)

This invention relates to the preparation of gas expanded plastic materials, particularly to the preparation of closed-cell cellular rubber—with new organic chemical blowing agents adapted—on thermal decomposition, to yield nitrogen gas. Although the chemicals are primarily adapted to the production of closed-cell cellular rubber, they may also be used in the preparation of cellular rubber in which the cells are interconnecting as in so-called sponge rubber.

The difficulties attendant the use of a proper blowing agent are many, and this applies also to a number of organic chemical blowing agents, as set forth in Richmond Patent No. 2,448,154. It has now been discovered that as good, if not better, results can be attained if certain aryl azo sulfones are employed as blowing agents.

The present chemical blowing agents are characterized by the grouping R—N=N—SO$_2$—R' where R is an aromatic radical and R' is a member of the group consisting of aromatic and aliphatic radicals.

The chemicals can be easily and completely mixed with the rubber or other organoplastic and do not impart an objectionable odor or color. They are, furthermore, non-staining to fabric and coatings which may come in contact with the rubber or other organoplastic. They are also non-toxic.

Exemplary of such effective blowing agents are:

Phenylazo ethyl sulfone

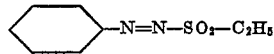

Phenylazo isopropyl sulfone

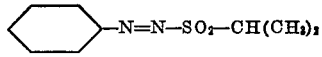

Phenylazo n-butyl sulfone

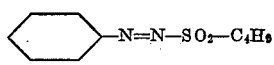

p-Xenylazo ethyl sulfone

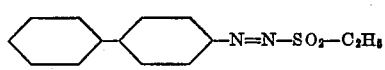

p-Chlorophenylazo ethyl sulfone

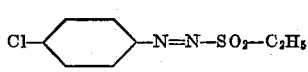

p-Chlorophenylazo methyl sulfone

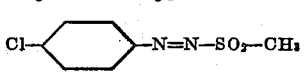

p-Tolylazo methyl sulfone

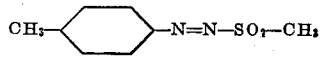

Phenylazo methyl sulfone

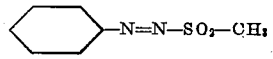

2,5-dichlorophenylazo methyl sulfone

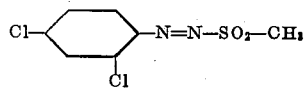

Phenylazo p-tolyl sulfone

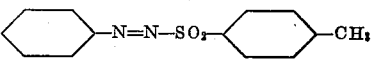

p-Tolylazo phenyl sulfone

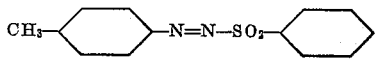

p-Chlorophenylazo-p-tolyl sulfone

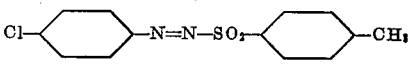

p-Chlorophenylazo phenyl sulfone

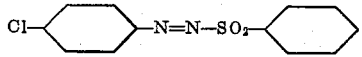

p-Chlorophenylazo p-chlorophenyl sulfone

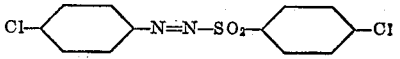

2,5-dichlorophenylazo-phenyl sulfone

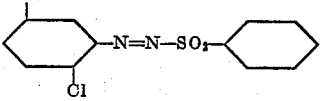

Phenylazo-p-chlorophenyl sulfone

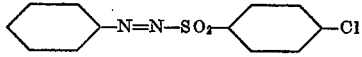

p-Tolylazo-p-chlorophenyl sulfone

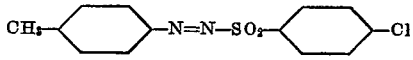

p-Tolylazo-p-tolyl sulfone

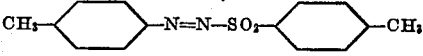

Biphenylazo-p-tolyl sulfone

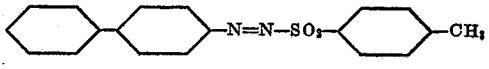

Diphenyl bis(azophenyl sulfone) 4,4'

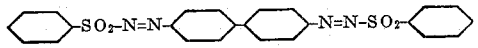

Di-p-tolyl bis(azophenyl sulfone) 4,4'

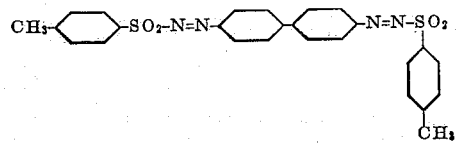

These azo sulfones may be prepared by reacting an aryl diazonium salt with an aliphatic or aromatic sulfinic acid as illustrated:

Suitable procedures are described in the literature. (A. Hantzsch and N. Singer, Ber. 30, 312 (1897); Koenigs, Ber. 10, 1232 (1877); Dutt et al., Jour. Chem. Soc. (London) 119, 2088 (1921); Dutt, Jour. Chem. Soc. (London) 125, 1463 (1924).

The preparation of p-chlorophenylazo methyl sulfone is typical and is described in detail. Other azo sulfones, especially the aromatic azo alkyl sulfones, can be prepared by this procedure using the appropriate starting reagents.

p-Chloroaniline (12.7 g.) was suspended in 100 cc. water and 20 cc. concentrated hydrochloric acid was added. The mixture was cooled with stirring, and 7 g. sodium nitrite in 50 cc. water was slowly added at 4–8° C. The clear diazonium chloride solution was then added with stirring to 250 cc. aqueous sodium methane sulfinate solution containing some crushed ice. A yellow precipitate formed. The reaction mixture was stirred 2 hours at room temperature, filtered, and the product washed well with water and dried at not over 40° C. Yield 20 g. (92%) of light yellow crystals melting 115–118° C. with gas evolution.

Gas evolution on heating at 135° C. in an inert solvent. Found: 99.00 cc./gram; theory 102 cc./gram.

The following examples are given to illustrate the invention, parts being by weight.

The amount of the blowing agents should exceed 1% and range up to 20%, or higher, by weight, based on the content of rubber or other organoplastic, depending upon the type of article being produced. In the case of plastics other than natural or synthetic rubbers, the quantity of blowing agent may range as high as 30 or more parts, by weight, per 100 parts of the plastic.

It is not intended to confine the invention to gas expanding natural rubber, since it can be applied to other organoplastics, and mixes thereof, such as are shown in U. S. Patent No. 2,448,154, namely, alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters, cellulose ethers, synthetic rubbers such as the rubbery copolymers of butadiene and styrene or acrylonitrile, rubbery copolymers of isobutylene and butadiene or isoprene polychloroprene, polyisobutylene, olefin polysulfides, etc. The preferred aspect of the invention is concerned with chemically blown cellular rubber because of its wider commercial advantages, in competition with foamed rubber latex products.

A rubber master batch was made up by combining the following ingredients on a rubber mill in the usual manner:

|  | Parts by weight |
|---|---|
| Pale crepe | 100.0 |
| Zinc oxide | 5.0 |
| Whiting | 30.0 |
| Lithopone | 30.0 |
| Zinc salt of cocoanut fatty acids | 10.0 |
| Petrolatum | 10.0 |
| Sulfur | 3.0 |
| Mercaptobenzothiazole | 1.0 |
|  | 189.0 |

This rubber master batch was divided and mixed in separate portions on a rubber mill with the chemicals listed in the proportions given.

|  | A | B | C | D | E | F |
|---|---|---|---|---|---|---|
| Rubber Master Batch | 189.0 | 189.0 | 189.0 | 189.0 | 189.0 | 189.0 |
| Phenylazo-p-tolyl sulfone | 3.0 | | | | | |
| p-Tolylazo phenyl sulfone | | 3.0 | | | | |
| p-Chlorophenylazo-p-tolyl sulfone | | | 3.0 | | | |
| p-Chlorophenylazo phenyl sulfone | | | | 3.0 | | |
| p-Chlorophenylazo-p-chloro-phenyl sulfone | | | | | 3.0 | |
| 2,5-Dichlorophenylazo phenyl sulfone | | | | | | 3.0 |

|  | G | H | I | J | K | L |
|---|---|---|---|---|---|---|
| Rubber Master Batch | 189.0 | 189.0 | 189.0 | 189.0 | 189.0 | 189.0 |
| Phenylazo-p-chlorophenyl sulfone | 3.0 | | | | | |
| p-Tolylazo-p-chlorophenyl sulfone | | 3.0 | | | | |
| p-Tolylazo-p-tolyl sulfone | | | 3.0 | | | |
| Biphenylazo-p-tolyl sulfone | | | | 3.0 | | |
| Diphenyl bis(azophenylsulfone)4,4' | | | | | 3.0 | |
| Di-p-tolyl bis(azophenyl sulfone)4,4' | | | | | | 3.0 |

|  | M | N | O | P | Q | R | S | T | U |
|---|---|---|---|---|---|---|---|---|---|
| Rubber Master Batch | 189.0 | 189.0 | 189.0 | 189.0 | 189.0 | 189.0 | 189.0 | 189.0 | 189.0 |
| p-Chlorophenylazo methyl sulfone | 2.5 | | | | | | | | |
| p-Tolylazo methyl sulfone | | 2.5 | | | | | | | |
| Phenylazo methyl sulfone | | | 2.0 | | | | | | |
| 4,4'Bis(methane sulfonylazo) biphenyl | | | | 2.5 | | | | | |
| 2,5-Dichlorophenylazo methyl sulfone | | | | | 3.0 | | | | |
| p-Chlorophenylazo ethyl sulfone | | | | | | 3.0 | | | |
| p-Xenylazo ethyl sulfone | | | | | | | 3.0 | | |
| 2,5-Dichlorophenylazo ethyl sulfone | | | | | | | | 3.0 | |
| 1,3-Diphenyl triazine | | | | | | | | | 3.0 |

The rubber stocks were sheeted into ¼" sheets and discs 2⅞" in diameter were cut, each weighing about 40 grams. These were placed in circular molds measuring ¾" deep and 3" in diameter. The samples were then press cured for 20 minutes at the temperature of 60 pounds' steam pressure. Upon removal from the molds each of the samples was obtained as a well-formed sponge disc, exhibiting a fine and uniform cellular structure. Stock U, containing the blowing agent of U. S. Patent No. 2,448,154, was dark in color, whereas stocks A through T, inclusive, were very much lighter in color.

Portions of each of stocks A through U, inclusive, were coated with a white nitrocellulose lacquer. The dried samples were exposed to sunlight for 5 days. The lacquer on stock U was badly discolored, whereas the lacquer coatings on the other stocks showed little or no discoloration.

With the rubber may be incorporated the usual compounding ingredients, including curing or vulcanizing agents such as sulfur, accelerators, activators, anti-oxidants, plasticizers, softeners, pigments, fillers, dye-stuffs, etc. If desired, reclaimed rubber may be incorporated in the mix. The rubber may be first broken down on the mill whereupon the blowing agent may be added followed by other ingredients, curatives usually being added last. After compounding, I prefer to allow the stock to stand for a day or more before carrying out the blowing and curing step or steps.

The manipulative methods of treating the compounded stock to obtain the expanded product are those which are well-known and standard in the art. For details of the art of making chemically gas expanded plastics such as rubber, attention may be directed to the article "Cellular Rubbers" by Gould appearing in Rubber Chemistry and Technology, vol. 17, pp. 943-956 (October 1944), and U. S. Patents to Cuthbertson No. 2,291,213 and to Roberts et al. No. 2,299,593. It is well within the present skill of the art, in the light of this disclosure, to compound a stock containing my blowing agent and process it so as to obtain either a sponge or a closed cell type of product.

The decomposition temperatures for gas-expanding by means of the chemical blowing agents may range from 80° C. to 200° C. Accordingly, the organoplastic should be capable of setting to a normally solid state and have sufficient consistency and tensile strength at temperatures of from about 80° C. to about 200° C. to retain the expanded structure resulting from the subsequent heating step involving decomposition of the blowing agent with evolution of nitrogen and expansion of the mass either in the mold or when removed therefrom.

Instead of using a single azo sulfone, a mixed azo sulfone can be used such as derived from the commercial mixture of ortho and para chloroaniline which upon diazotization and coupling with p-tolyl sulfinic acid forms a mixture of p-chlorophenyl azo-p-tolyl sulfone and o-chlorophenyl azo-p-tolyl sulfone.

p-Tolyl sulfinic acid is the preferred sulfinic acid to use because it is easily prepared from p-tolyl sulfonchloride, an economical chemical.

Having thus described my invention, what I claim and desire to protect by Letters Patent is:

1. The method of making a gas expanded organoplastic material which comprises mixing an aryl azo sulfone in which the aryl ring is additionally attached only to radicals selected from the class consisting of hydrogen, halogen, and alkyl, with an organoplastic material which is capable of setting to a normally solid state and having sufficient consistency and tensile strength at temperatures of from 80° C. to 200° C. to retain the expanded structure resulting from the subsequent heating step, and decomposing said sulfone by heat to evolve nitrogen and expand said organoplastic material.

2. The method of making a gas expanded rubber which comprises mixing an aryl azo sulfone in which the aryl ring is additionally attached only to radicals selected from the class consisting of hydrogen, halogen, and alkyl, with rubber, decomposing said sulfone by heat to evolve nitrogen and expand said rubber, and curing the rubber to cause it to retain its expanded condition.

3. The method of making a gas expanded organoplastic material which comprises mixing an aryl azo sulfone in which the aryl ring is additionally attached only to radicals selected from the class consisting of hydrogen, halogen, and alkyl, with an organoplastic material which is capable of setting to a normally solid state and having sufficient consistency and tensile strength at temperatures of from 80° C. to 200° C. to retain the expanded structure resulting from the subsequent heating step, decomposing said sulfone by heat to evolve nitrogen and expand said organoplastic material, and setting said organoplastic material to retain its expanded condition.

4. The method of making a gas expanded rubber which comprises mixing a phenyl azo aryl sulfone in which the aromatic rings are additionally attached only to radicals selected from the class consisting of hydrogen, halogen, and alkyl, with rubber, decomposing said sulfone by heat to evolve nitrogen and expand said rubber, and curing the rubber to cause it to retain its expanded condition.

5. The method of making a gas expanded rubber which comprises mixing p-chlorophenyl azo p-tolyl sulfone with rubber, decomposing said sulfone by heat to evolve nitrogen and expand said rubber, and curing the rubber to cause it to retain its expanded condition.

6. The method of making a gas expanded rubber which comprises incorporating a mixture of p-chlorophenyl azo p-tolyl sulfone and o-chlorophenyl azo p-tolyl sulfone with rubber, decomposing said mixture by heat to evolve nitrogen and expand said rubber, and curing the rubber to cause it to retain its expanded condition.

7. The method of making a gas expanded rubber which comprises mixing biphenyl azo p-tolyl sulfone with rubber, decomposing said sulfone by heat to evolve nitrogen and expand said rubber, and curing the rubber to cause it to retain its expanded condition.

8. The method of making a gas expanded organoplastic material which comprises mixing a phenyl azo alkyl sulfone in which the aromatic ring is attached only to radicals selected from the class consisting of hydrogen, halogen, and alkyl, with an organoplastic material which is capable of setting to a normally solid state and having sufficient consistency and tensile strength at temperatures of from 80° C. to 200° C. to retain the expanded structure resulting from the subsequent heating step, and decomposing said sulfone by heat to evolve nitrogen and expand said organoplastic material.

9. The method of making a gas expanded rubber which comprises mixing a phenyl azo alkyl sulfone in which the aromatic ring is attached only to radicals selected from the class consisting of hydrogen, halogen, and alkyl, with rubber, decomposing said sulfone by heat to evolve nitrogen and expand said rubber, and curing the rubber to cause it to retain its expanded condition.

RUTH L. SCHLESSINGER.

REFERENCES CITED

The following references are of record in the file of this patent:

UNITED STATES PATENTS

| Number | Name | Date |
|---|---|---|
| 2,299,593 | Roberts et al. | Oct. 20, 1942 |
| 2,335,730 | Blake | Nov. 30, 1943 |
| 2,448,154 | Richmond | Aug. 31, 1948 |

OTHER REFERENCES

Saunders: "The Aromatic Diazo Compounds and Thin Technical Applications," London, 1936, pp. 48–50.